US011926305B2

United States Patent
Plaehn et al.

(10) Patent No.: US 11,926,305 B2
(45) Date of Patent: Mar. 12, 2024

(54) METHOD FOR THE AUTOMATED ELECTRONIC CONTROL OF A BRAKE SYSTEM IN A UTILITY VEHICLE HAVING ANTI-LOCK BRAKING PROTECTION

(71) Applicant: WABCO GmbH, Hannover (DE)

(72) Inventors: Klaus Plaehn, Seelze (DE); Julian Van Thiel, Grossburgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 569 days.

(21) Appl. No.: 17/264,313

(22) PCT Filed: Jun. 27, 2019

(86) PCT No.: PCT/EP2019/067128
§ 371 (c)(1),
(2) Date: Jan. 29, 2021

(87) PCT Pub. No.: WO2020/025226
PCT Pub. Date: Feb. 6, 2020

(65) Prior Publication Data
US 2021/0291798 A1    Sep. 23, 2021

(30) Foreign Application Priority Data

Aug. 1, 2018  (DE) .................... 10 2018 118 720.3

(51) Int. Cl.
*B60T 8/88*         (2006.01)
*B60T 8/171*        (2006.01)
(Continued)

(52) U.S. Cl.
CPC .............. *B60T 8/885* (2013.01); *B60T 8/171* (2013.01); *B60T 8/1761* (2013.01);
(Continued)

(58) Field of Classification Search
CPC ........ B60T 8/885; B60T 8/171; B60T 8/1761; B60T 8/1766; B60T 13/683; B60T 2270/10; B60T 2270/413; B60T 2270/88
See application file for complete search history.

(56) References Cited

U.S. PATENT DOCUMENTS

| 6,206,488 B1 | 3/2001 | Binder et al. |
| 10,875,509 B2 | 12/2020 | Werner |

(Continued)

FOREIGN PATENT DOCUMENTS

| DE | 19733379 A1 | 2/1999 |
| DE | 102014006615 A1 | 11/2015 |

(Continued)

*Primary Examiner* — Michael D Lang
(74) *Attorney, Agent, or Firm* — LEYDIG, VOIT & MAYER, LTD.

(57) ABSTRACT

A method for automatic electronic control of a brake system in a vehicle includes reading a brake signal for the automatic electronic control of brakes in the vehicle, wherein requests to be implemented by the brakes are transmitted via the brake signal to bring about automatically requested target vehicle longitudinal dynamics. The method further includes determining a brake pressure distribution indicating a ratio of a front axle brake pressure of a front axle to a rear axle brake pressure of a rear axle, and providing at least a first brake pressure signal of the first electronic control unit to at least a first electropneumatic control device, taking into account the braking request signal and the brake pressure distribution for controlling the front axle brake pressure and the rear axle brake pressure, and receiving the brake pressure distribution at a second electronic control unit and storing the detected brake pressure distribution.

26 Claims, 2 Drawing Sheets

(51) Int. Cl.
*B60T 8/1761* (2006.01)
*B60T 8/1766* (2006.01)
*B60T 13/68* (2006.01)

(52) U.S. Cl.
CPC .......... *B60T 8/1766* (2013.01); *B60T 13/683* (2013.01); *B60T 2270/10* (2013.01); *B60T 2270/413* (2013.01); *B60T 2270/88* (2013.01)

(56) References Cited

U.S. PATENT DOCUMENTS

| | | |
|---|---|---|
| 2019/0118786 A1 | 4/2019 | Wulf |
| 2019/0152459 A1 | 5/2019 | Dieckmann et al. |

FOREIGN PATENT DOCUMENTS

| | | |
|---|---|---|
| DE | 102014107399 A1 | 11/2015 |
| DE | 102016005317 A1 | 11/2017 |
| DE | 102016005318 A1 | 11/2017 |
| DE | 102016113249 A1 | 1/2018 |

METHOD FOR THE AUTOMATED ELECTRONIC CONTROL OF A BRAKE SYSTEM IN A UTILITY VEHICLE HAVING ANTI-LOCK BRAKING PROTECTION

CROSS REFERENCE TO RELATED APPLICATIONS

This application is a U.S. National Phase Application under 35 U.S.C. § 371 of International Application No. PCT/EP2019/067128, filed on Jun. 27, 2019, and claims benefit to German Patent Application No. DE 10 2018 118 720.3, filed on Aug. 1, 2018. The International Application was published in German on Feb. 06, 2020 as WO 2020/025226 A1 under PCT Article 21(2).

FIELD

The present disclosure relates to a method for the automated electronic control of a brake system in a vehicle, in particular a utility vehicle, in particular in an automatically controllable utility vehicle. The present disclosure further relates to an electronically controllable pneumatic brake system for a vehicle, in particular a utility vehicle, in particular an automatically controllable utility vehicle as well as such a vehicle.

BACKGROUND

In vehicles, in particular utility vehicles, with a pneumatic brake system, in particular designed as an electronic service brake system (EBS), control valves, such as relay valves or axle modulators, can be controlled electronically by a control device (ECU) for controlling brake pressures, which then pneumatically control a brake pressure to the brake cylinders of service brakes of the brake system depending on a requested target vehicle acceleration. The electronically controlled pneumatic brake pressure is superimposed on the control of a brake pressure depending on the actuation of a braking force controller or brake encoder via a brake pedal by the driver, so that the driver can also perform emergency braking in an automatically controlled vehicle in an emergency and/or can override the electronically controlled brake pressure.

In such redundant brake systems, in which the driver, in the event of failure of the electronic service brake system (EBS), can pneumatically control the brake pressure by means of a brake pedal, for example, an anti-lock brake system function (ABS) is not functional or is only partially functional and thus locking of vehicle axles is not excluded. The stability of the vehicle suffers from this. It is desirable that the stability of the vehicle is largely maintained even in such a redundant case. A similar problem exists with automatically controllable utility vehicles, in particular the higher levels of automation (levels 3 to 5), where the problem of locking already occurs when, for example, a wheel speed sensor fails, and a slip can no longer be determined reliably. Previous solutions in such a case provide in particular redundant wheel revolution rate sensors, or redundantly controlled wheel revolution rate sensors. However, such solutions are associated with higher costs due to the additional components and the additional installation effort.

An alternative to this is to use a so-called "cadence brake", which also prevents the locking of axles. However, this affects the comfort of the vehicle.

From DE 10 2014 006 615 A1, for example, a pneumatic brake system with a service brake device is known which has a brake encoder for electrically issuing a braking request, for example, depending on a brake pedal operation. Furthermore, a parking brake is provided, which in particular can actuate the wheel brakes of the rear axle. The brake encoder of the service brake device is connected to the parking brake device by a data transmitter, so that in the event of an electrical defect in the service brake device, braking requested by the driver can also be carried out via the parking brake device on the rear axle. This creates redundancy. The disadvantage of this is that in the event of redundancy, the vehicle is only braked with the parking brake on the rear axle, resulting in an unfavorable braking force distribution and a limited braking effect.

Another solution provides for an electronically controllable pneumatic brake system having at least two brake circuits, wherein at least one of the at least two brake circuits is assigned an electrically and pneumatically controllable control valve and another of the at least two brake circuits is assigned an electrically controllable parking brake valve, for specifying brake pressures for the control of wheel brakes of the respective brake circuits. A first control unit is provided for this and designed to drive the control valve electrically depending on an automatically requested target vehicle deceleration or an actuation specified by the driver via an actuating device. A second control unit is provided and designed to electrically control the parking brake valve depending on the automatically requested target vehicle deceleration, if electrical control of the respective control valve is prevented, to form an electronically-pneumatically controlled redundancy. The brake system is characterized by the fact that at least one bypass valve assigned to a control valve is also provided, which is designed to pneumatically control the assigned control valve, wherein the pneumatic control is carried out depending on the automatically requested target vehicle deceleration or depending on the actuation of the actuation device specified by the driver if electrical control of the respective control valve is prevented in order to expand the electronically-pneumatically controlled redundancy. Accordingly, it is consequently provided, in an electronically controllable pneumatic brake system, in which, by means of electronic specification of a target vehicle deceleration, in particular a negative acceleration, automated driving, in particular automatic braking, is enabled to form an electronic-pneumatic fallback level or redundancy in that, in addition to a control unit which automatically controls at least one electrically and pneumatically controllable control valve assigned to a brake circuit, a second control unit is provided, by means of which, in particular in the event of redundancy, electrical control of a parking brake valve and electrical-pneumatic control of the control valve can be carried out via a bypass valve. The redundancy case occurs in this case in particular when electrical control of the control valve by means of the first control unit is prevented.

SUMMARY

In an embodiment, the present invention provides a method for the automatic electronic control of a brake system in a vehicle. The method includes reading a brake signal for the automatic electronic control of brakes in the vehicle, wherein requests to be implemented by the brakes are transmitted via the brake signal to bring about automatically requested target vehicle longitudinal dynamics. The method further includes determining a brake pressure distribution indicating a ratio of a front axle brake pressure of a front axle to a rear axle brake pressure of a rear axle, and providing at least a first brake pressure signal of the first electronic control unit to at least a first electropneumatic control device, taking into account the braking request signal and the brake pressure distribution for controlling the front axle brake pressure and the rear axle brake pressure, and receiving the brake pressure distribution at a second electronic control unit and storing the detected brake pressure distribution. In addition, the method includes, in response to determining that the braking request signal cannot be processed or read in correctly: receiving the braking request signal or a redundant braking request signal at the second electronic control unit, and in response to the reception of the braking request signal or the redundant braking request signal at the second electronic control unit, controlling a redundant front axle brake pressure and a redundant rear axle brake pressure while taking into account the stored brake pressure distribution.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
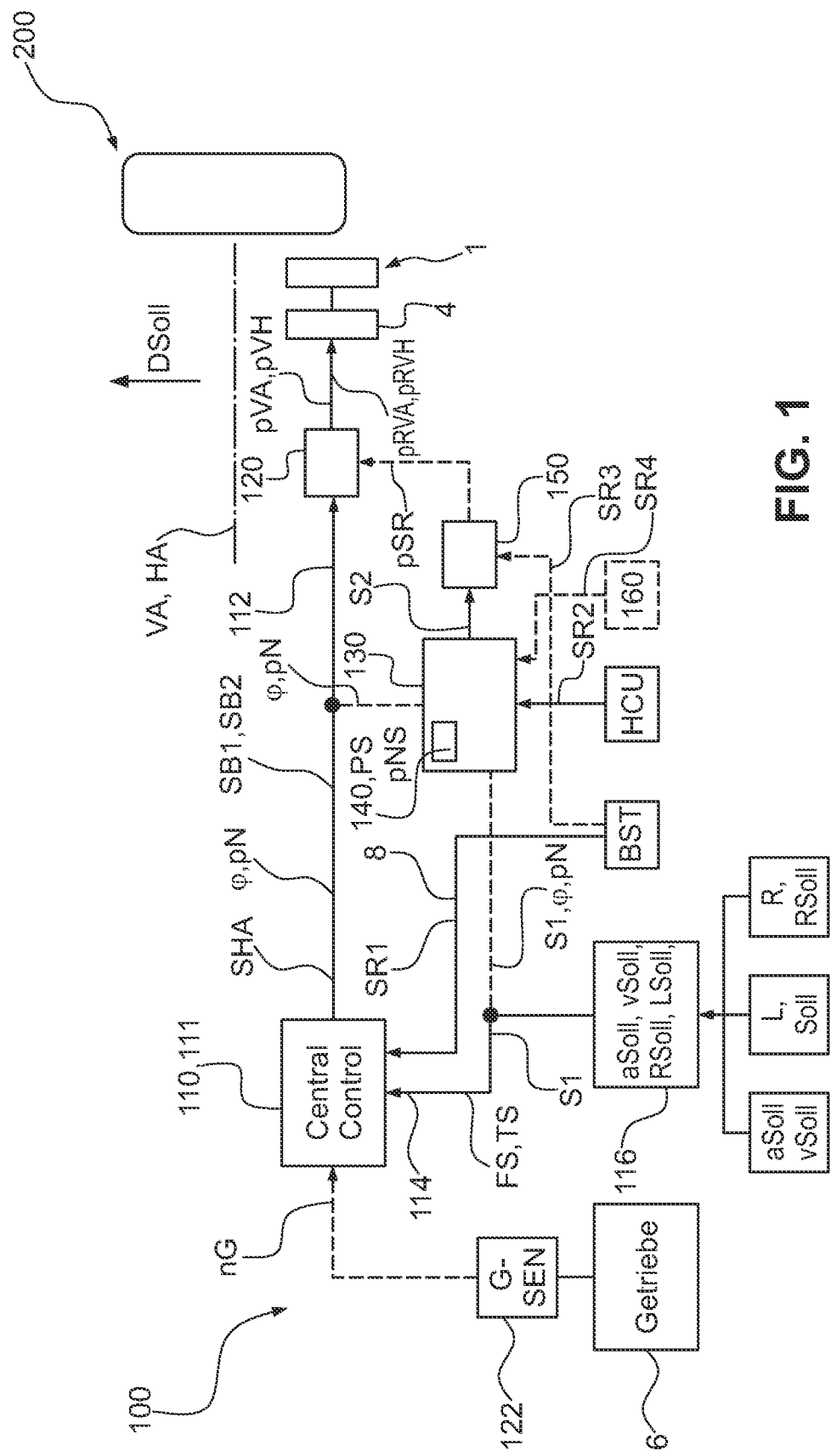
FIG. 1 shows a brake system in accordance with a first embodiment as a block diagram.

In contrast to prior art solutions, the present disclosure provides for a different approach that achieves at least rudimentary anti-lock control, even in a redundancy case, in particular during manual control of a braking request signal.

The present disclosure provides, in a first aspect, a method for the automated electronic control of a brake system in a vehicle, in particular a utility vehicle, and in a second aspect, an electronically controllable brake system.

According to the present disclosure, in an electronically controllable brake system it is therefore provided to read in a braking request signal for the automated electronic control of brakes in the vehicle. The braking request signal transmits the requests to be implemented by the vehicle's brakes to bring about automatically requested target vehicle longitudinal dynamics. That is, for example, a target speed and/or a target acceleration are transmitted by means of the braking request signal. Furthermore, the method includes the determination of a brake pressure distribution indicating a ratio of a front axle brake pressure of a front axle and a rear axle brake pressure of a rear axle. For example, this brake pressure distribution can be determined in a central module, based on data from, for example, wheel revolution rate sensors, a load of the vehicle, a load of a possible trailer and similar. The brake pressure distribution can be used to set an axle locking sequence.

The method further includes a provision of at least a first brake pressure signal from a first electronic control unit to at least a first electropneumatic control device taking into account the braking request signal and the brake pressure distribution for controlling at least the front axle brake pressure and the rear axle brake pressure.

The front axle and rear axle brake pressures are determined taking into account the brake pressure distribution and based on the braking request signal provided, for example, by an autonomous driving unit. Preferably, it may be provided that the first brake pressure signal is provided for the front axle and a second brake pressure signal is provided, which is intended for the rear axle.

Furthermore, the method includes the step: receiving the brake pressure distribution at a second electronic control unit and storing the detected brake pressure distribution and, in the event that the braking request signal cannot be processed or read in correctly: receiving the braking request signal or a redundant braking request signal at the second electronic control unit, and in response to the reception of the braking request signal or the redundant braking request signal at the second electronic control unit, controlling a redundant front axle brake pressure and a redundant rear axle brake pressure while taking into account the stored brake pressure distribution.

The present disclosure therefore provides, in the event that the braking request signal cannot be processed or read in correctly, either processing by means of a second electronic control unit, or a redundant braking request signal is received, for example from a manually operable brake pedal, and the last received and stored brake pressure distribution is used for processing these signals. The brake pressure distribution is usually provided over a vehicle bus, and the second electronic control unit is used according to the invention to read out this brake pressure distribution from the vehicle bus, for example, and either to store it itself or to cause another control unit to store it.

Although the last brake pressure distribution used is usually not optimally matched to the current driving situation (in the event of redundancy), it can still be used as a guide and can at least provide rudimentary protection and allow a brake pressure distribution-appropriate output of redundant front axle and rear axle brake pressures. This can prevent the locking of axles, or the locking sequence can be specified, whereby the vehicle stability can be increased.

The control of the redundant front axle brake pressure and the redundant rear axle brake pressure is not only carried out taking into account the stored brake pressure distribution, but also taking into account the braking request signal received at the second electronic control unit or the redundant braking request signal. The control of the redundant rear axle and front axle brake pressures can be carried out on the one hand by the first electropneumatic control device, when this receives corresponding signals from the second electronic control unit, by the second electropneumatic control device, or even by the second electronic control unit directly.

Preferably, in this method it is provided that the brake pressure distribution at the second control unit is continuously detected and stored. The term continuous should also include quasi-continuous detection and storage, which, for example, detects and stores the brake pressure distribution with a detection rate of 1 Hz.

Alternatively, it may also be provided that the brake pressure distribution is detected and stored once after the start of the journey. It may preferably be provided that the storage of the brake pressure distribution takes place only after the completed learning process.

In another preferred embodiment, the method includes the steps: receiving a brake pressure level at the second electronic control unit and storing the detected brake pressure level; and in the event that the braking request signal is not processed or not processed properly or cannot be read in: controlling the redundant front axle brake pressure and the redundant rear axle brake pressure with while taking into account the stored brake pressure level. In this way, not only the brake pressure distribution is stored and taken into account when controlling the redundant front and rear axle brake pressures, but also the brake pressure level. In the event, for example, that a driver operates a brake pedal in the redundancy case, the previously used brake pressure level can also be taken into account in order to control the redundant front axle and rear axle brake pressures. This also prevents the locking of vehicle axles. Vehicle stability can be increased.

Again, the brake pressure level at the second control unit can be continuously detected and stored, wherein again quasi-continuous detection and storage should also be included. The redundant front axle and rear axle brake pressures are then controlled not only based on the brake pressure level, but also on the braking request signal or the redundant braking request signal, and preferably based on the brake pressure distribution.

Furthermore, it is preferred that a timeout signal and/or a transmitted fault condition signal is detected at the second electrical control unit in the event that the braking request signal cannot be processed or read in correctly. Preferably, messages of the service brake are monitored for such a timeout signal and/or error state signal. The timeout signal and/or fault condition signal can therefore be used to trigger the control of the redundant braking request signal or its processing. Also, the timeout signal and/or the fault condition signal can be used to trigger a subsequent saving of the current brake pressure distribution and/or the current brake pressure level, which can then be used subsequently for the control of the redundant front axle and rear axle brake pressures. Once a signal indicating proper working of the service brakes is received again instead of the timeout signal or error state signal, normal operation can be resumed.

In a preferred development, it is preferably provided that the drive output revolution rate is received at the second electronic control unit and slip of the driven axle is determined based on the received drive output revolution rate. An output revolution rate of a gearbox is preferably used as the drive output revolution rate. A slip indication for the drive axle can be determined by an evaluation of the gradients. The front axle or rear axle brake pressure, in particular the redundant front axle or rear axle brake pressure, can be adjusted to prevent locking of the axle based on the slip of the driven axle and in combination with the stored brake pressure distribution and preferably the brake pressure level.

Furthermore, it is preferred that the stored brake pressure distribution is overwritten in the memory by a detected brake pressure distribution only when a valid braking request signal is read in again and properly processed. This prevents the saving of incorrectly identified brake pressure distributions which are determined, used, or detected during a redundancy mode.

The redundant braking request signal is preferably provided by a parking brake switch, a brake pedal, or another electronic control unit. In vehicles with a lower degree of automation, the redundant braking request signal is preferably provided by a parking brake switch or a brake pedal. A parking brake switch is a switch in the driver's cab with which the driver can apply parking brakes. In the redundancy case, such parking brakes are often used for additional braking. A brake pedal is operated manually if necessary and can control an electronic and/or pneumatic braking request signal. In the case of vehicles with a higher degree of automation, a further electronic control unit may be provided, which will provide a redundant braking request signal in the event of redundancy, if the control system for autonomous driving does not issue a braking request signal or this cannot be processed properly.

In the context of the method it is preferably further provided that the reading in of the braking request signal is carried out by the first electronic control unit, and wherein the first electronic control unit receives the brake pressure distribution or determines it based on received data and/or internal data and provides the determined brake pressure distribution. Depending on the source, the braking request signal can be read in, for example, via a vehicle bus, a separate bus, or another channel, such as direct cabling. For example, brake signal generators and/or parking brake switches are usually connected directly to the first electronic control unit, so that provision via the vehicle bus is not necessary. Where appropriate, the braking request signal may be transmitted on from the first electronic control unit via the vehicle bus. When the first electronic control unit determines the pressure distribution, this is preferably carried out using external data, such as the axle load, which are received, for example, via the vehicle bus or another channel, as well as using internal data from the brake system, such as in particular wheel speeds, slip, etc. These internal data are usually not received via the vehicle bus but are provided directly by sensors or other units in the brake system.

In some embodiments it may be provided that the braking request signal already contains the brake pressure distribution, but this is isolated from the braking request signal by the first electronic control unit.

Preferably, the second electronic control unit is also connected to a further bus or the vehicle bus and the second electronic control unit receives the brake pressure distribution via the further bus or the vehicle bus.

Preferably, the second electronic control unit is set up, based on the received redundant braking request signal or the braking request signal, to provide switching signals at least to a second electropneumatic control device and/or the first electropneumatic control device such that the second electropneumatic control device and/or the first electropneumatic control device controls at least one of the redundant front axle brake pressure and the redundant rear axle brake pressure. The second electronic control unit thus preferably takes over the provision of switching signals in the case of redundancy in order to control at least the front axle brake pressure or the rear axle brake pressure. However, the control of these pressures is preferably not carried out by the electronic control unit itself, but either by the first electropneumatic control device or the second electropneumatic control device. It may also be provided that depending on the respective fault which is present in the central module or a higher-level unit for autonomous driving, either the first electropneumatic control device or the second electropneumatic control device is controlled by the second control unit.

The second electronic control unit may be, for example, the control unit of an electropneumatic parking brake module. The redundant rear axle brake pressure is preferably controlled directly from the electropneumatic parking brake module in this case. It is preferably also generated by the electropneumatic parking brake module. This is a simple design, since the electropneumatic parking brake module is connected to the rear axle anyway in order to apply parking brakes when the vehicle is in the parked state. This parking brake module can therefore be advantageously used to control the redundant rear axle brake pressure even in the redundancy case.

Furthermore, it is preferred that in one variant the second electropneumatic control device provides at least a redundant control pressure at the first electropneumatic control device for controlling the redundant front axle brake pressure. For example, here too, the second electropneumatic control device is the control device of an electropneumatic parking brake module. The redundant control pressure can be, for example, the redundant rear axle brake pressure controlled at the rear axle, which is provided as a redundant control pressure for the front axle at the first electropneumatic control device. This then uses the redundant rear axle brake pressure provided as a redundant control pressure to control the redundant front axle brake pressure based on this. This is carried out in this embodiment according to the invention using the braking force distribution, which is stored.

In a second aspect, an electronically controllable pneumatic brake system is provided for a vehicle, in particular a utility vehicle, which is designed in particular for carrying out the method according to one of the above-described preferred embodiments of the method according to the first aspect. The brake system has at least: a first electronic control unit for receiving a braking request signal for the automatic electronic control of brakes in the vehicle, wherein the braking request signal to be implemented by the brakes is transmitted to bring about automatically requested target vehicle longitudinal dynamics, wherein the first electronic control unit is designed to determine a brake pressure distribution and to provide at least a first brake pressure signal while taking into account the braking request signal and the brake pressure distribution. At least a first electropneumatic control device, which is connected to the first electronic control unit for receiving the first brake pressure signal, wherein the first electropneumatic control device is designed for controlling at least the front axle brake pressure and/or the rear axle brake pressure. A second electronic control unit which is connected to the first electronic control unit for receiving the brake pressure distribution and storing the detected brake pressure distribution. The second electronic control unit is designed to be used in the event that that the braking request signal cannot be processed or read correctly, to do the following: receive the braking request signal or a redundant braking request signal, and in response to the reception of the braking request signal or a redundant braking request signal, to cause the control of a redundant front axle brake pressure and a redundant rear axle brake pressure while taking into account the stored brake pressure distribution.

It should be understood that the method according to the first aspect and the system according to the second aspect have the same or similar sub-aspects as they are laid down in particular in the dependent claims. In this respect, for the preferred embodiments and advantages reference is made in full to the above description of the first aspect of the invention.

In this respect, it is preferably provided that the second electronic control unit is set up to continuously detect and store the brake pressure distribution. For this purpose, the second electronic control unit may have its own memory. It can also be connected to an external memory to store the detected brake pressure distribution in the external memory. The term continuous should include continuous and quasi-continuous detection and/or storage.

Furthermore, it is preferred that the second electronic control unit is designed to detect a brake pressure level and store it as a stored brake pressure level. Furthermore, the second electronic control unit is set up to control the redundant front axle brake pressure and the redundant rear axle brake pressure while taking into account the stored brake pressure level, in the event that the braking request signal cannot be processed or read in correctly. This means that the second electronic control unit receives the braking request signal or the redundant braking request signal and implements it using the stored brake pressure level.

Also the brake pressure level is preferably continuously detected and stored, wherein this in turn also includes quasi-continuous detection and storage.

In a preferred development, the second electronic control unit is set up to receive a drive output revolution rate. This drive output revolution rate is preferably the output revolution rate of a gearbox of the vehicle. Furthermore, the electronic control unit is preferably set up to determine a slip of the driven axle, based on the received drive output revolution rate. In utility vehicles, the driven axle is usually the rear axle.

Furthermore, it is preferred that the second electronic control unite is set up to overwrite the brake pressure distribution stored in the memory by a detected brake pressure distribution only when a valid braking request signal can be read in and processed correctly. This applies both when starting the vehicle and after a previous phase of redundancy operation.

In the event that a redundant braking request signal is to be used, the electronically controllable pneumatic brake system will preferably have a parking brake switch and/or another electronic control unit which is set up to provide the redundant braking request signal. Depending on the embodiment, the electronically controllable pneumatic brake system can also have all three variants.

Preferably, the first electronic control unit is connected to the vehicle bus and receives the braking request signal via the vehicle bus or another interface. In the braking request signal, the brake pressure distribution can already be passed with it, or this will be passed separately and received by the first electronic control unit via the vehicle bus or another interface. It can also be determined on the basis of data received via the vehicle bus or another interface and/or internal data of the first electronic control unit and can then be made available via the vehicle bus. The data obtained via the vehicle bus may be in particular the axle load of the vehicle. Based on this, the first electronic control unit can determine the pressure distribution.

In a corresponding manner, the second electronic control unit is preferably connected to the vehicle bus and receives the brake pressure distribution via the vehicle bus or a separate bus. Alternatively, the second electronic control unit may also be connected in other ways and in particular directly to the first electronic control unit.

In a further preferred embodiment, the second electronic control unit is designed to provide switching signals based on the received redundant braking request signal or the braking request signal at least to a second electropneumatic control device and/or the first electropneumatic control device, such that the second electropneumatic control device and/or the first electropneumatic control device controls at least one of the redundant front axle brake pressure or the redundant rear axle brake pressure. For this purpose, the second electronic control unit may be connected to the first or second electropneumatic control device or integrated into it.

In addition to the named functions, the second electronic control unit can also perform other functions, in particular controlling the first and/or second electropneumatic control device during normal operation.

In an example of a preferred embodiment, the second electronic control unit is the control unit of an electropneumatic parking module, which is designed to directly control the redundant rear axle brake pressure. That is, the second electronic control unit has a dual function in this embodiment, in that it also controls the electropneumatic parking brake module during normal operation.

In a further preferred variant, the second electropneumatic control device is set up to provide a redundant control pressure at the first electropneumatic control device for controlling the redundant front axle brake pressure.

In a third aspect, a vehicle, in particular a utility vehicle, with an electronically controlled pneumatic brake system according to one of the above preferred embodiments of an electronically controlled pneumatic brake system according to the second aspect, which is suitable for carrying out a method according to one of the above described embodiments of the first aspect.

It should be understood that the method according to the first aspect, the brake system according to the second aspect, and the vehicle according to the third aspect have the same and similar sub-aspects. In this respect, for the preferred embodiments as well as the advantages relating to the vehicle, reference is made to the above descriptions of the method according to the first aspect and the brake system according to the second aspect.

Embodiments are now described below on the basis of the drawings. These are not necessarily intended to represent the embodiments to scale, but the drawings are executed in schematized and/or slightly distorted form if this is appropriate for explanation. With regard to additions to the teachings immediately recognizable from the drawings, reference is made to the relevant prior art. It must be taken into account that various modifications and changes regarding the form and detail of an embodiment can be made without deviating from the scope of the present disclosure. In addition, all combinations of at least two of the features disclosed in the description, drawings and/or claims fall within the scope of the disclosure. The invention is not limited to the exact form or detail of the preferred embodiments shown and described below or limited to subject matter which would be limited in comparison to the subject matter claimed in the claims. With the specified dimensional ranges, values within the specified limits should also be disclosed as limit values and be usable and claimable at will. For simplicity, the same reference characters are used below for identical or similar parts or parts with identical or similar functions.

In the embodiment according to FIG. 1, a section of a brake system 100 of a vehicle 200 is shown as a block diagram. Accordingly, the brake system 100 has a first electronic control unit 110 and a first electropneumatic control device 120. The first electronic control unit 110 is formed in this embodiment as a so-called central module 111 and is connected to the first electropneumatic control unit 120 via a first bus 112. The first electronic control unit 110 provides at least a first brake pressure signal SB1, preferably also a second brake pressure signal SB2, at the first electropneumatic control device 120 via the first bus 112. The first electropneumatic control device 120 preferably has an electronic control unit (not shown) as well as one or more valves (not shown), which are used to convert the first brake pressure signal SB1, and preferably the second brake pressure signal SB2, into at least a front axle brake pressure pVA and/or a rear axle brake pressure pVH. For this purpose, the first electropneumatic control device 120 is preferably connected to a compressed air supply (see FIG. 2). In the exemplary embodiment presented in FIG. 1, the first electropneumatic control unit 120 provides the front axle brake pressure pVA or the rear axle brake pressure pVH to a wheel brake 1, which in this exemplary embodiment is upstream of an ABS brake valve 4.

The first electronic control unit 110, in this exemplary embodiment the central module 111, is connected by a vehicle bus 114 to a unit for autonomous driving 116. This unit for autonomous driving 116 specifies according to FIG. 1 a target acceleration aSoll, a target speed vSoll, a target vehicle direction RSoll and a target vehicle steering angle LSoll. Together, these values form the vehicle longitudinal dynamics DSoll.

The unit for autonomous driving 116 provides a braking request signal S1 to the first electronic control unit 110 via the vehicle bus 114. Optionally, the first electronic control unit 110 is also connected to a revolution rate sensor 122, which detects the output revolution rate nG of a gearbox 6 and accordingly provides it to the first electronic control unit 110. Based on the output revolution rate nG and the wheel revolution rate nRHA, which is detected by wheel revolution rate sensors 161 on the rear axle HA, the slip SHA on the rear axle HA can be determined, which is the driven axle here. The slip SHA can also be provided separately, e.g. via the first bus 112.

In the exemplary embodiment shown in FIG. 1, the first electronic control unit 110 determines a brake pressure distribution φ from the braking request signal S1. The brake pressure distribution φ indicates how the brake pressure should be divided between the front axle VA and the rear axle HA to enable stable braking of the vehicle 200. The brake pressure distribution φ is provided by the first electronic control unit 110 via the first bus 112.

Furthermore, the electronically controllable pneumatic brake system 100 comprises a manually operated brake pedal BST. The manually operated brake pedal BST is connected to the first electronic control unit 110 via a brake pedal cable 8 and provides a first redundant brake signal SR1 to it. This first redundant braking request signal is used, for example, if the unit for autonomous driving 116 fails, to be implemented by the first electronic control unit 110 in order to electronically control the front axle brake pressure pVA and the rear axle brake pressure pVH as a redundant front axle brake pressure pRVA and a redundant rear axle brake pressure pRVH.

The electronically controllable pneumatic brake system 100 also has a second electronic control unit 130, which is connected to the first electronic control unit 110 for receiving the brake pressure distribution φ and storing the detected brake pressure distribution φ as a stored brake pressure distribution φS. For this purpose, the second electronic control unit 130 is connected to the vehicle bus 114 and receives via this the first braking request signal S1, and thus also the brake pressure distribution φ and preferably also a brake pressure level pN. The second electronic control unit 130 has a memory 140 in which the second electronic control unit 130 stores the received brake pressure distribution φ as a stored brake pressure distribution φS and the received brake pressure level pN as a stored brake pressure level pNS. This is preferably carried out continuously or quasi-continuously. Preferably, the previously stored value is overwritten by the current value.

Alternatively or in addition, the second electronic control unit 130 may also be connected to the first bus 112, via which the brake pressure distribution φ and the brake pressure level pN can also be provided from the first electronic control unit 110 to the first electropneumatic control device 120.

The second electronic control unit 130 is set up to provide switching signals S2 to a second electropneumatic control device 150 based on the stored brake pressure distribution φS and the stored brake pressure level pNS. The second electropneumatic control device 150 preferably has one or more valves (not shown) which are set up to switch on based on the received switching signals S2 and to control corresponding pressures. In the present exemplary embodiment (FIG. 5) the second electropneumatic control device 150 is set up to control a redundant control pressure pSR based on reception of the switching signals S2 from the second electronic control unit 130, namely in this exemplary embodiment at the first electropneumatic control device 120. The first electropneumatic control device 120 is preferably set up in this exemplary embodiment at least to control either a redundant front axle brake pressure pRVA or a redundant rear axle brake pressure pRVH based on the reception of the redundant control pressure pSR.

If a fault occurs and the braking request signal S1 cannot be processed or read in correctly, for example because the first electronic control unit 110 has a fault and/or the unit for autonomous driving 116 has a fault, preferably a timeout signal TS is provided via the vehicle bus 114. The redundancy case occurs and the second electronic control unit 130 can take over the control of the brake system 100. Alternatively or in addition to the timeout signal TS, a fault condition signal FS can also be read in, which indicates a fault condition of the service brakes 1.

In the event that the first electronic control unit 110 has failed, the second electronic control unit 130 can process the braking request signal S1 if it is connected to the vehicle bus 114, as shown in FIG. 1.

However, if no braking request signal S1 is provided, for example because the unit for autonomous driving 116 has failed, the second electronic control unit 130 can provide a redundant braking request signal, such as the first redundant braking request signal SR1, which is provided by the first control unit 110 via the first bus 112, or a second redundant braking request signal SR2, which is provided, for example, by a hand brake switch HCU. Such redundant braking request signals, in particular when they come from the handbrake switch HCU, do not usually include information about a brake pressure distribution or a brake pressure level. The second electronic control unit 130 is designed in the exemplary embodiment shown (FIG. 1) to process the second redundant braking request signal SR2, taking into account the stored brake pressure distribution φS and the stored brake pressure level pNS, and based on this to provide corresponding switching signals S2 to the second electropneumatic control device 150. Based thereon, this controls at least a first redundant control pressure pSR, and based on this the first electropneumatic control device 120 controls the redundant front axle brake pressure pRVA and/or the redundant rear axle brake pressure pRVH.

The core idea of the present exemplary embodiment is therefore the detection of brake parameters, namely the brake pressure distribution φ and the brake pressure level PN of the service brake system, by means of a second control unit, in this case the second electronic control unit 130. In the event of failure of the service brake system, the redundant brake pressure control is implemented by means of the second electric control unit 130.

In variants of the first exemplary embodiment (FIG. 1) it may also be provided that the redundant front axle brake pressure pRVA and/or the redundant rear axle brake pressure pRVH is directly controlled by the second electropneumatic control device 150 on at least one wheel brake 1. The indirect control with intermediate connection of the first electropneumatic control device 120 is not mandatory.

Figure 2:
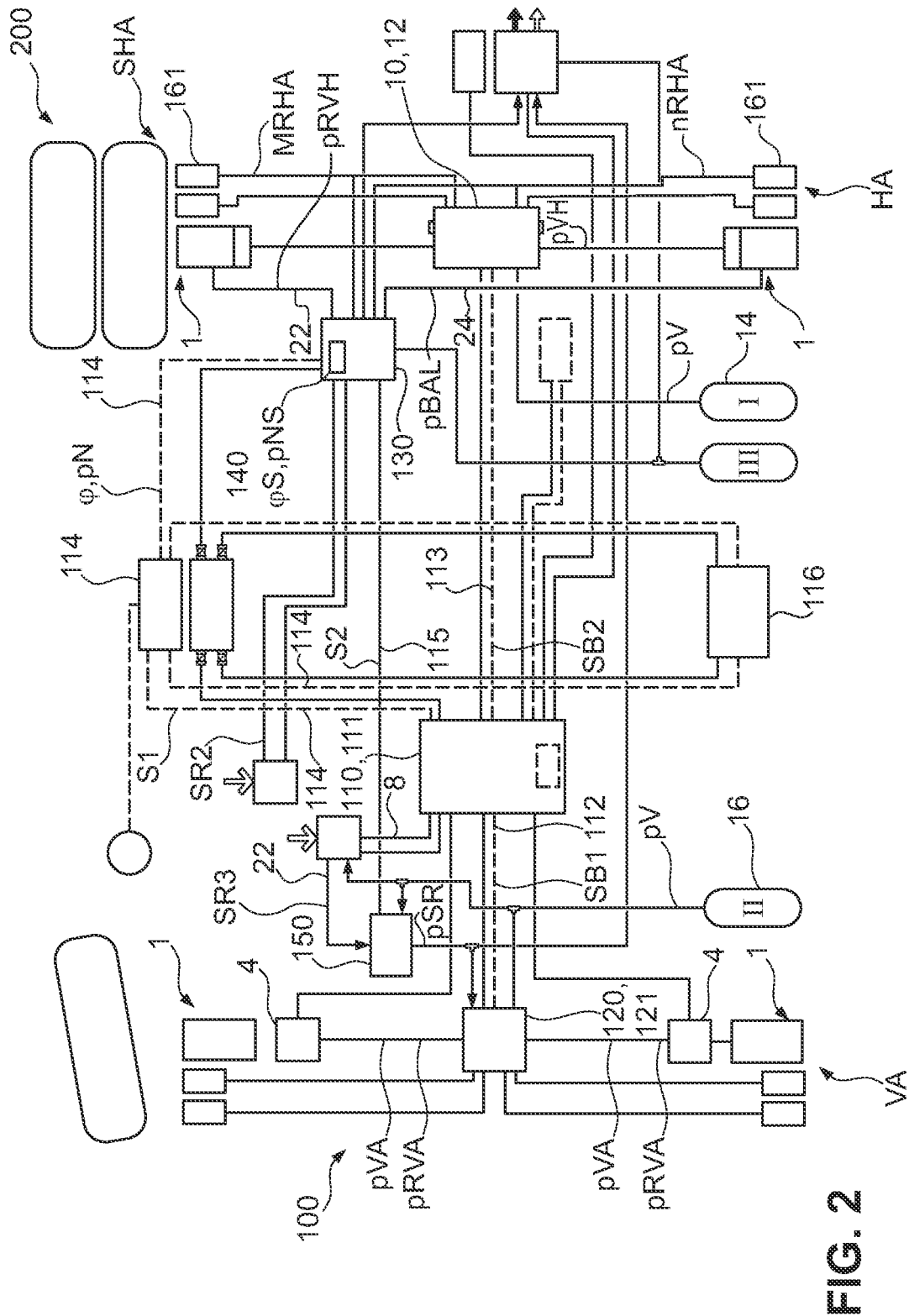
FIG. 2 shows a brake system of a second embodiment as a block diagram.

FIG. 2 now shows a second exemplary embodiment, wherein the same and similar elements are provided with the same reference characters, so that full reference is made to the above description of the first exemplary embodiment. In the second exemplary embodiment (FIG. 2) a complete brake system 100 of a vehicle 200, in particular a utility vehicle 200, is shown. The first electronic control unit 110 is again formed by a central module 111, which is connected via the vehicle bus 114 to the unit for autonomous driving 116. The central module 111 receives the braking request signal S1 via the vehicle bus 114.

The central module 111 is further connected by a first bus 112 to the first electropneumatic control device 120, which is in the form of a front axle modulator 121 in this exemplary embodiment (FIG. 2). The front axle modulator 121 is set up to provide the front axle brake pressure pVA at the wheel brakes 1 of the front axle VA. For this purpose, the front axle modulator 121 receives a first braking signal SB1 from the central module 111 via the first bus 112. The front axle modulator 121 is connected to a second compressed air supply 16, which provides a supply pressure pV to the front axle modulator 121.

The central module 111 is further connected by a second bus 113 to another electropneumatic control device 10, which is formed in this exemplary embodiment as a rear axle modulator 12. The central module 111 provides a second braking signal SB2 via the second bus 113 to the rear axle modulator 12. The rear axle modulator 12 is designed to control a corresponding rear axle brake pressure pVH at corresponding wheel brakes 1 of the rear axle HA based on the received second brake signal SB2. For this purpose, the rear axle modulator 12 is further connected to a first compressed air supply 14, which provides the reservoir pressure pV to the rear axle modulator 12.

Furthermore, the central module 111 is connected to a brake pedal BST, which is connected to the second compressed air supply 16 via a first pneumatic line 20. By operating the brake pedal BST, both an electrical redundant braking request signal SR1 can be provided via the brake pedal line 8 to the central module 111 as well as a pneumatic redundant braking request signal SR3 via a second pneumatic line 22 to a second electropneumatic control device 150. This is designed to control at least one pneumatic control pressure pSR based on the received pneumatic third redundant braking request signal SR3 and to provide it to the first electropneumatic control device 120, namely the front axle modulator 121. The front axle modulator 121 then controls the redundant front axle brake pressure pRVA at the wheel brakes 1 of the front axle VA, based on the received pneumatic control pressure pSR.

The second electronic control unit 130 is integrated with an electropneumatic parking brake module EPH in this second exemplary embodiment (FIG. 2). This means that the second electronic control unit 130 is the electronic control unit of the parking brake module EPH. The parking braking module EPH is also connected to the unit for autonomous driving 116 via the vehicle bus 114 and receives via the vehicle bus 114 the braking request signal S1 and in this or separately the brake pressure distribution φ and the brake pressure level pN. In the parking brake module EPH a memory 114 is provided, in which the second electronic control unit 130 stores the received brake pressure distribution φ and the received brake pressure level pN as the stored brake pressure distribution φS and the stored brake pressure level pNS. The parking brake module EPH is directly connected to the second electropneumatic control device 150 via a third bus 115.

In the event that the braking request signal S1 is not provided or not properly provided or processed by the unit for autonomous driving 116, or can be processed or received by the central module 111, it is possible according to this embodiment that the parking brake module EPH receives the braking request signal S1 via the vehicle bus 114 and provides a corresponding switching signal S2 via the third bus 115 to the second electropneumatic control device 150, which based on this controls the redundant control pressure pSR and provides it to the front axle modulator 112. The front axle modulator 112 can then control the redundant front axle brake pressure pRVA based on the redundant control pressure pSR. The first braking signal SB1, which the front axle modulator 121 receives from the central module 111 in normal operation, is not required in this redundancy case.

The switching signals S2 are provided by the parking brake module EPH, in particular in this by the second electronic control unit 130 taking into account the stored brake pressure distribution φS and the stored brake pressure level pNS. The parking brake module EPH is also directly connected via the first and second parking brake pressure lines 22, 24 to the wheel brakes 1 of the rear axle HA, so that in this embodiment (FIG. 2) the parking brake module EPH can directly control the redundant rear axle brake pressure pRVH. This is also controlled while taking into account the stored brake pressure distribution φS and the stored brake pressure level pNS. In this way, axle-appropriate brake pressure control can be carried out, so that locking can be largely prevented.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS aSoll target vehicle acceleration
BST brake pedal
DSoll target vehicle dynamics
HA rear axle
LSoll target vehicle steering angle
nG output revolution rate
pN brake pressure level
pNS stored brake pressure level
pSR redundant control pressure
RSoll target vehicle direction
S2 Switching signals
SHA slip at the rear axle
SB1 first brake pressure signal
SB2 second brake pressure signal
SR1 first redundant braking request signal
SR2 second redundant braking request signal
SR3 third redundant braking request signal
SR4 fourth redundant braking request signal
FS fault condition signal
TS timeout signal
VA front axle
vSoll target vehicle speed
φ brake pressure distribution
φS stored brake pressure distribution
1 wheel brake
4 ABS brake valve
6 gearbox
8 brake pedal line
10 further electropneumatic control device
12 rear axle modulator
14 first compressed air supply
16 second compressed air supply
20 first pneumatic line
22 first parking brake pressure line
24 second parking brake pressure line
100 electrically controllable pneumatic brake system
110 first electronic control unit
111 central module
112 first bus
113 second bus
114 vehicle bus
115 third bus
116 unit for autonomous driving
120 first electropneumatic control device
121 front axle modulator
122 revolution rate sensor
130 second electronic control unit
140 memory
150 second electropneumatic control device
160 further electronic control unit
161 wheel revolution rate sensors
200 vehicle, utility vehicle

The invention claimed is:

1. A method for the automatic electronic control of a brake system in a vehicle, the method comprising:
reading a brake signal for the automatic electronic control of brakes in the vehicle, wherein requests to be implemented by the brakes are transmitted via the brake signal to bring about automatically requested target vehicle longitudinal dynamics;
determining a brake pressure distribution indicating a ratio of a front axle brake pressure of a front axle to a rear axle brake pressure of a rear axle;
providing at least a first brake pressure signal of the first electronic control unit to at least a first electropneumatic control device, taking into account the braking request signal and the brake pressure distribution for controlling the front axle brake pressure and the rear axle brake pressure;

receiving and storing the determined brake pressure distribution at a second electronic control unit; and in response to determining that the braking request signal cannot be processed or read in correctly:

receiving the braking request signal or a redundant braking request signal at the second electronic control unit, and in response to the reception of the braking request signal or the redundant braking request signal at the second electronic control unit, controlling a redundant front axle brake pressure and a redundant rear axle brake pressure while taking into account the stored brake pressure distribution.

2. The method as claimed in claim 1, wherein the brake pressure distribution at the second control unit is continuously detected and stored.

3. The method as claimed in claim 1, further comprising:

receiving a brake pressure level at the second electronic control unit and storing the detected brake pressure level; and in response to determining that the braking request signal cannot be processed or read in correctly:

controlling the redundant front axle brake pressure and the redundant rear axle brake pressure while taking into account the stored brake pressure level.

4. The method as claimed in claim 3, wherein the brake pressure level at the second control unit is continuously detected and stored.

5. The method as claimed in claim 1, wherein in response to determining that the braking request signal cannot be processed or read in or properly processed or read in, a timeout signal and/or a transmitted fault condition signal is detected at the second electronic control unit.

6. The method as claimed in claim 1, further comprising:

receiving a drive output revolution rate at the second electronic control unit; and determining a slip of the driven axle based on the received drive output revolution rate.

7. The method as claimed in claim 1, wherein the stored brake pressure distribution is only overwritten in the memory by a detected brake pressure distribution in response to a valid braking request signal being read in again and processed correctly.

8. The method as claimed in claim 1, wherein the redundant braking request signal is provided by a parking brake switch, a brake pedal or another electronic control unit.

9. The method as claimed in claim 1, wherein the reading of the braking request signal is carried out by the first electronic control unit, and wherein the first electronic control unit receives the brake pressure distribution or determines it on the basis of received data and/or internal data and provides the determined brake pressure distribution.

10. The method as claimed in claim 1, wherein the second electronic control unit is connected to a separate bus or the vehicle bus and receives the brake pressure distribution via the vehicle bus or the separate bus.

11. The method as claimed in claim 1, wherein the second electronic control unit provides switching signals based on the received redundant braking request signal or the braking request signal at least to a second electropneumatic control device and/or the first electropneumatic control device, in such a way that the second electropneumatic control device and/or the first electropneumatic control device at least controls or control one of the redundant front axle brake pressure and the redundant rear axle brake pressure.

12. The method as claimed in claim 11, wherein the second electronic control unit is the control unit of an electropneumatic parking brake module, and wherein the redundant rear axle brake pressure is directly controlled by the electropneumatic parking brake module.

13. The method as claimed in claim 11, wherein the second electropneumatic control device provides a redundant control pressure at the first electropneumatic control device for controlling the redundant front-axle brake pressure.

14. An electronically controllable pneumatic brake system for a vehicle, the brake system comprising:

a first electronic control unit configured to receive a braking request signal for the automatic electronic control of brakes in the vehicle, wherein the braking request signal requests a target vehicle speed and/or acceleration to be implemented by the brakes to bring about automatically requested target vehicle longitudinal dynamics, wherein the first electronic control unit is configured to determine a brake pressure distribution and to provide at least a firsts brake pressure signal while taking into account the braking request signal and the brake pressure distribution, a first electropneumatic control device connected to the first electronic control unit for receiving the first brake pressure signal, wherein the first electropneumatic control device is designed to control at least the front axle brake pressure and/or the rear axle brake pressure;

a second electronic control unit connected to the first electronic control unit and configured to receive the determined brake pressure distribution and to store the detected determined brake pressure distribution;

wherein the second electronic control unit is configured, in the event that the braking request signal cannot be corrected or read in correctly, to:

receive the braking request signal or a redundant braking request signal, and cause, in response to the reception of the braking request signal or a redundant braking request signal, control of a redundant front axle brake pressure and a redundant rear axle brake pressure while taking into account the stored brake pressure distribution.

15. The electronically controllable pneumatic brake system as claimed in claim 14, wherein the second electronic control unit is configured to continuously detect and store the brake pressure distribution as long as the braking request signal can be processed.

16. The electronically controllable pneumatic brake system as claimed in claim 14, wherein the second electronic control unit is configured to detect a brake pressure level and store it as a stored brake pressure level; and in response to the braking request signal not being processed or read in correctly:

control the redundant front axle brake pressure and the redundant rear axle brake pressure while taking into account the stored brake pressure level.

17. The electronically controllable pneumatic brake system as claimed in claim 16, wherein the second electronic control unit is configured to continuously detect and store the brake pressure level as long as the braking request signal can be processed.

18. The electronically controllable pneumatic brake system as claimed in claim 14, wherein the second electronic power unit is configured to:

receive a drive output revolution rate; and determine a slip of the driven axle based on the received drive output revolution rate.

19. The electronically controllable pneumatic brake system as claimed in claim 14, wherein the second electronic control unit is configured to overwrite the stored brake pressure distribution in the memory with a detected brake pressure distribution only when a valid braking request signal can be read in and processed correctly.

20. The electronically controllable pneumatic brake system as claimed in any claim 14, further comprising a parking brake switch, a brake pedal and/or another electronic control unit for providing the redundant braking request signal.

21. The electronically controllable pneumatic brake system as claimed in claim 14, wherein the first electronic control unit is designed to receive the braking request signal and is further designed to receive the brake pressure distribution or to determine it based on received data and/or internal data and to provide the determined brake pressure distribution.

22. The electronically controllable pneumatic brake system as claimed in claim 14, wherein the second electronic control unit is connected to a separate bus or the vehicle bus and is configure to receive the brake pressure distribution via the vehicle bus or the separate bus.

23. The electronically controllable pneumatic brake system as claimed in claim 14, wherein the second electronic control unit is configured to provide switching signals based on the received redundant braking request signal or the braking request signal at least to a second electropneumatic control device and/or the first electropneumatic control device so that the second electropneumatic control device and/or the first electropneumatic control device controls or control at least one of the redundant front axle brake pressure and the redundant rear axle brake pressure.

24. The electronically controllable pneumatic brake system as claimed in claim 23, wherein the second electronic control unit is the control unit of an electropneumatic parking brake module, which is configured to control the redundant rear axle brake pressure directly.

25. The electronically controllable pneumatic brake system as claimed in claim 23, wherein the second electropneumatic control device is configured to provide a redundant control pressure to the first electropneumatic control device for controlling the redundant front brake pressure.

26. A vehicle having an electronically controlled pneumatic brake system as claimed in claim 14.

* * * * *